INVENTORS
EDWARD R. GILMORE
HAROLD E. SPORE

BY Strauch, Nolan & Diggins
ATTORNEYS

United States Patent Office 2,949,125
Patented Aug. 16, 1960

2,949,125

FLUID FLOW SYSTEM AND CONTROL THEREFOR

Edward R. Gilmore and Harold E. Spore, Tulsa, Okla., assignors to Rockwell Manufacturing Company, Pittsburgh, Pa., a corporation of Pennsylvania Filed Nov. 28, 1952, Ser. No. 322,921

17 Claims. (Cl. 137—100)

The present invention relates in general to fluid flow measuring systems and more specifically to flow measuring systems which are adapted to be automatically accommodated to wide variations in the volume of fluid flow.

More specifically the present invention relates to improvements in fluid flow systems in which primary and auxiliary flow measuring instruments are interposed in parallel flow relation in a fluid channel and in which the auxiliary measuring instrument is automatically cut into the system when the flow exceeds a predetermined maximum for the instrument of the main channel. Systems of this general type have been known for many years as is illustrated by United States Patent No. 1,308,569, issued July 1, 1919, to T. B. Wylie for Apparatus for Measuring Gas and Other Fluids, and United States Patent No. 1,503,591, issued August 5, 1924, to Kerr et al. for Fluid Supply System.

It is a fundamental object of this invention to provide, in a fluid flow system, a control system for automatically turning additional measuring units into a fluid line when needed and completely shutting off such units when not required to obtain more accurate measurements in installations in which there is considerable variation in the rate of flow, which control system is more simple and positive than prior art systems for this purpose.

One of the fundamental disadvantages of prior art systems of this general type has been their failure to provide for the positive shift of the auxiliary unit between its operative and inoperative conditions. To overcome this disadvantage by providing for the actuation of a controlling valve by a fluid motor reversibly empowered by the controlled application of line pressure of the main in which the flow is being measured is, therefore, a further important object of this invention.

An object of the present invention is to provide in combination with a main and auxiliary flow measuring instruments connected in parallel flow relation in a fluid flow system, a control system actuated in response to the flow through the main instrument reaching predetermined maximum and minimum rates to respectively automatically enable and disenable flow through the auxiliary instrument by actuation of a motor controlled valve connected in series with the auxiliary instrument.

A still further object of the present invention is to provide, in a fluid flow system having main and auxiliary parallel flow measuring channels, an improved control system for automatically enabling and disenabling flow through the auxiliary channel when flow through the main channel reaches predetermined maximum and minimum values and which is directly controlled by the flow measuring instrument of the main channel.

These and other objects of the present invention will become more fully apparent by reference to the appended claims and as the following detailed description proceeds in reference to the acompanying drawings wherein:

Figure 3 is an enlarged fragmentary view of the pressure relief valve of the control system of Figure 2; and Figure 4 is an enlarged fragmentary view of the relay valve of the control system of Figure 2.

Figure 1:
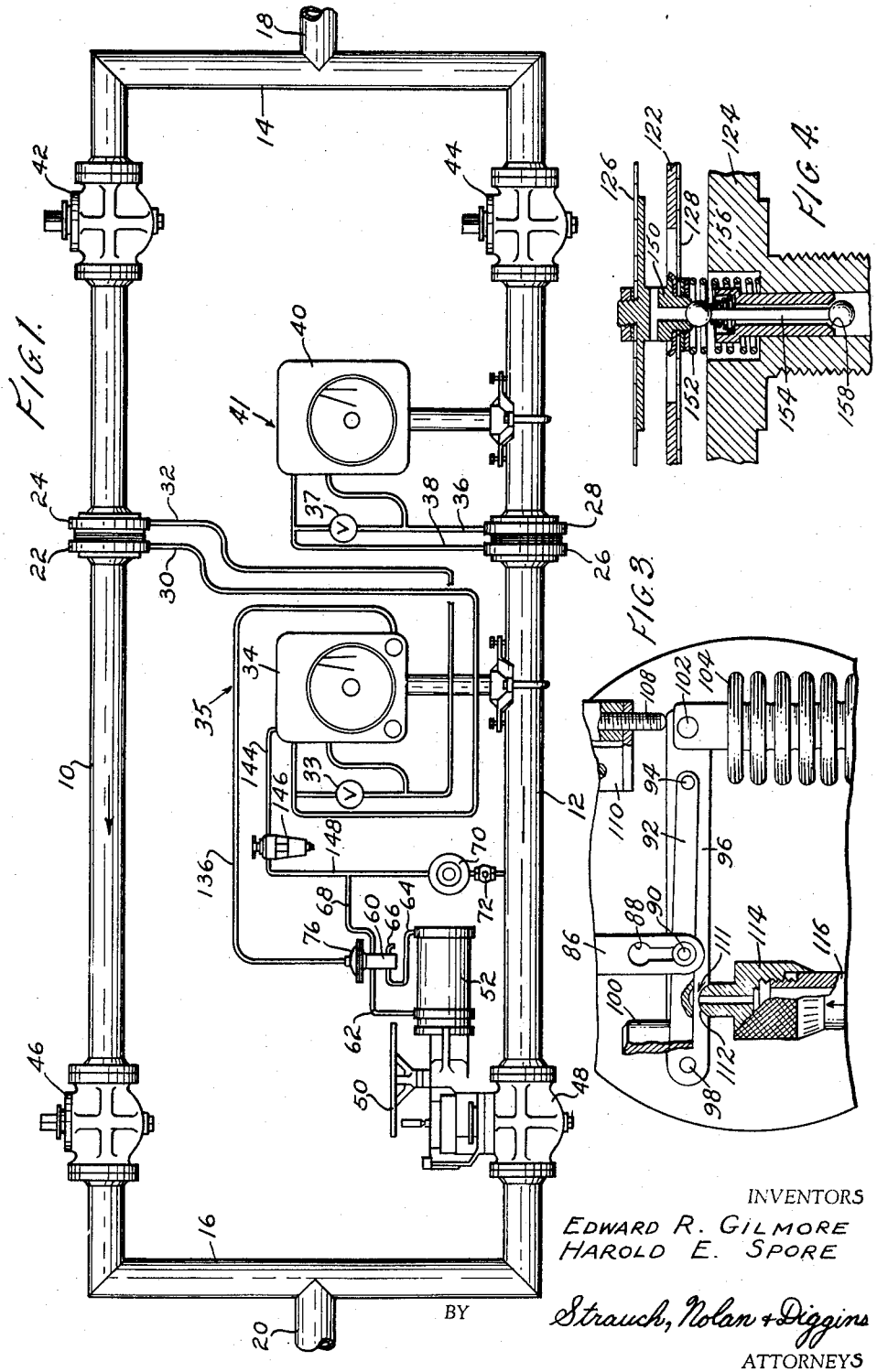
Figure 1 is a diagrammatic view illustrating in general the fluid flow measuring system of the present invention.

Referring now to the drawings and particularly to Figure 1, the preferred form of the fluid flow measuring system constituting the present invention is illustrated as comprising a main fluid flow channel 10 and an auxiliary fluid flow channel 12 connected in parallel flow relation between an inlet manifold 14 and an outlet manifold 16 interposed in the main 18–20.

In the illustrated embodiment of the invention, the flow through the main channel 10 and the auxiliary channel 12 is determined by the measurement of the differential pressure across thin plate orifices conventionally interposed between mounting flanges 22 and 24 in the main channel 10 and 26 and 28 in the auxiliary channel 12. Pressure taps are provided at the opposite sides of the orifice of the main channel 10 which are connected through suitable conduits 30 and 32, the latter containing a normally closed valve 33, to a manometer type flow calculating and recording instrument 34 of the conventional type which, with its associated orifice, pressure taps, and conduits is generally known as an orifice meter, indicated as a whole by reference numeral 35. Similarly pressure taps are provided at the upstream and downstream side of the thin plate orifice of the auxiliary channel 12 which are connected by conduits 36 and 38 respectively, the former containing normally closed valve 37, to a similar manometer type flow calculating and recording instrument 40. The flow calculating and recording instrument 40 and its associated orifice, pressure taps and conduits jointly comprise a conventional recording flow meter, indicated in its entirety by reference numeral 41, for recordation of the flow through the auxiliary channel.

The flow calculating and recording instruments 34 and 40 of orifice meters 35 and 41 are conventional in construction and it will suffice to say that in the preferred form they are of the type in which a pivotal pen shaft is connected through a suitable linkage to a float disposed upon a U-tube mercury column subjected at its opposite ends to the pressure on the opposite sides of the thin plate orifice to which the meter is connected. The pivotal pen shaft carries a pen which cooperates with a chart rotated in timed relation to provide an indication of the flow. The flow measuring instrument of the auxiliary channel 12 may if desired be a positive displacement type meter.

Upstream of the thin plate orifices of the primary channel 10 and the auxiliary channel 12 are provided manually operable shut off valves 42 and 44 which are preferably of the plug valve type of which a suitable form is disclosed in United States Letters Patent No. 2,144,080, issued on January 17, 1939, to S. J. Nordstrom for Valve. At the downstream side o tfhe thin plate orifice of the main channel 10 is also provided a similar plug type manually operable shut-off valve 46.

At the downstream side of the orifice of the auxiliary channel 12 is provided a motor actuated shut-off valve 48 which is equipped with a hand wheel 50 for manual operation when necessary. This motor actuated valve 48 may be of any suitable construction but is preferably of the plug valve type similar to the manually actuable valves 42, 44 and 46 provided with a gear sector (not shown) connected to its plug (not shown) which is engaged by a reciprocable rack (not shown) which is directly connected to the piston (not shown) of a fluid motor 52. Motor actuated valves of this type are well known in the art and need not be shown or described in detail herein. If a more detailed description is found to be necessary to an understanding of the present invention, reference is made to United States Letters Patent No. 2,302,370, issued November 17, 1942, to E. E. Hedene for Fluid Operated Check Valves, which discloses a fluid motor actuated plug valve suitable for use herein.

It is with reference to the control of the opening and closing of this valve 48 in accordance with the flow through the main channel 10 that the present invention is primarily directed. The present invention provides a control system for the valve 48 which, if valve 48 is closed, will maintain valve 48 in its closed condition and thus prevent flow through the auxiliary channel 12 and recordation on recording instrument 40 until the flow through the main channel 10 reaches a predetermined maximum as determined by the orifice meter 35. When the flow through the main channel 10 reaches such predetermined maximum, the motor 52 will be energized automatically to open the valve 48 to permit fluid flow through the auxiliary channel 12 as well as though the main channel 10. The control system of the present invention is effective to maintain valve 48 in its open condition until such time as the flow through the main channel 10 has reduced to a predetermined minimum at which time the motor 52 will be automatically reversely actuated to effect closure of valve 48 and thereby terminate flow through the auxiliary channel 12.

It will be recognized that, while in its illustrated embodiment but two fluid channels have been shown, that is a main channel and a single auxiliary channel, the present invention may be used with any number of parallel auxiliary flow channels. Thus by mere duplication of the control system hereinafter to be described in detail, a second auxiliary channel could be controlled by the flow through the first auxiliary channel 12 in the same manner that the flow through the auxiliary channel 12 is controlled by the flow through the main channel 10 and thus any number of auxiliary channels may be provided in parallel to accommodate automatically extremely wide variations in quantity of flow.

Figure 2:
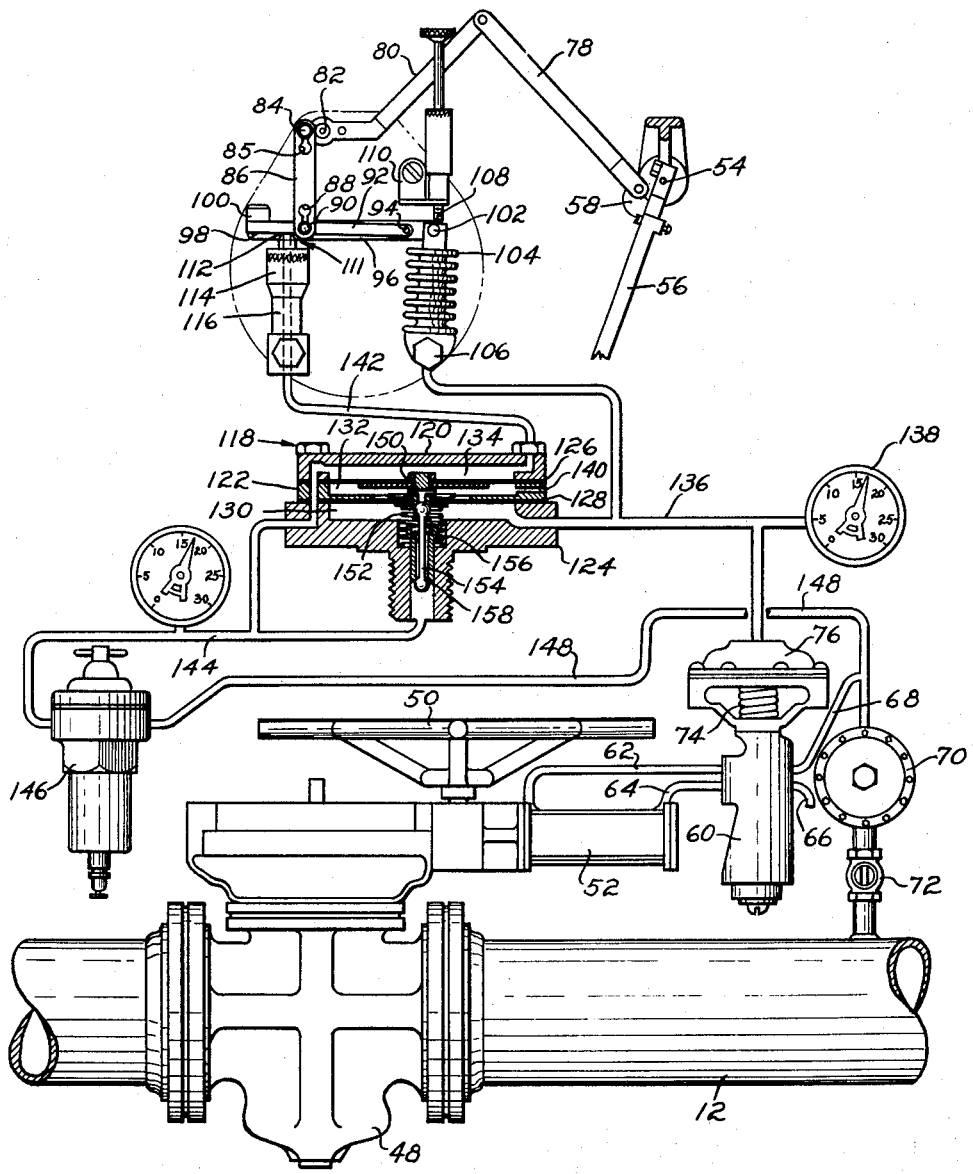
Figure 2 is a diagrammatic illustration of the control system for automatically enabling and disenabling the auxiliary flow channel.

The details of the improved form of control system are illustrated diagrammatically in Figure 2. As has been previously indicated, a pen shaft, designated 54 in Figure 2, is caused to assume various pivotal positions about its axis in accordance with the movement of a float resting upon the mercury U-tube connected at its opposite ends to pressure taps on the opposite side of of the thin plate orifice of the main channel 10. Thus the position of pen shaft 54 is at all times indicative of the flow through the main channel 10. As is conventional, a differential pen arm 56 is rigidly connected to the pen shaft 54 for pivotal movement therewith. To this pen arm 56 is rigidly attached a differential lever arm 58 likewise for pivotal movement with the pen shaft 54. The differential lever arm 58 and the pen arm 56 move in a counterclockwise direction about the axis of pen shaft 54 in response to an increase in the differential pressure across the orifice of the main channel 10 upon an increase in the flow therethrough and in a clockwise direction in response to a reduction of such differential pressure upon decrease in the flow. The control system illustrated in Figure 2 is actuated when the lever arm 58 reaches a predetermined counterclockwise position to apply fluid pressure to the fluid motor 52 to open the valve 48 and when the lever arm 58 reaches a predetermined clockwise position in its pivotal path to reversely energize motor 52 to close the valve 48.

The energization of motor 52 is controlled by a two position four-way valve 60, which is connected by channels 62 and 64 to the cylinder of motor 52 at opposite sides of the piston (not shown) of the motor 52, and also is connected by an open ended duct 66 to atmosphere and by a duct 68 through a pressure regulator 70 and a non-return or check valve 72 to the auxiliary channel 12 as a source of fluid pressure. The two position four-way valve 60 is effective in one position to connect channel 62 to duct 66 and channel 64 to duct 68 and in its other position to connect channel 62 to duct 68 and channel 64 to duct 66. Thus, in accordance with the position of the valve 60 channels 62 and 64 are alternatively connected to a fluid pressure source, which in this embodiment is the upstream side of the shut-off valve 48 in channel 12, and to an exhaust to atmosphere. Valve 60 is resiliently biased to one of its said two positions by a spring member 74 and is provided with a fluid motor 76 which is operable in opposition to the spring 74 to shift the valve 60 to the other of its said positions. The valve 60 is of such construction that, when the fluid motor 76 is actuated, the channels 62 and 64 and the ducts 66 and 68 are so interconnected that the motor 52 is energized to drive valve 48 to its closed position and, when fluid motor 76 is deenergized, to drive valve 48 to its open position.

The energization and deenergization of fluid motor 76 is controlled by a fluid relay control system, now to be described, which is under the control of the lever arm 58 attached to the pen arm 56.

When the pen arm 56 moves in a counterclockwise direction in response to an increase in flow in the main channel 10, a differential connecting link 78, which is attached at its opposite ends to a bell crank 80 and to lever arm 58, causes the bell crank 80 to pivot in a clockwise direction about its pivot 82 thus raising a lift pin 84 secured to the end of bell crank 80. This pin 84 engages an elongated slot 85 in a lift link 86 which, at its lower end, is formed with a similar elongated slot 88. Slot 88 is similarly engaged by a pin 90 which is fixed to a lever 92. By this lost motion linkage, bell crank 80 can pivot in a clockwise direction from zero position a predetermined amount before pin 84 engages the upper end of elongated slot 85 in lift link 86 to cause movement of lift link 86, and lift link 86 can move upwardly a predetermined amount before its lower end reaches the position shown in Figure 2 whereupon it engages the pin 90 to effect movement of the lever 92. Thus, when the linkage is in the position shown in Figure 2, pin 84 is located in the upper end of slot 85 in lift link 86 and pin 90 is located in the lower end of the slot 88 in the lift link, whereby any further pivotal movement of bell crank 80 in a clockwise direction will cause upward movement of lift link 86 and of lever 92. Then when bell crank 80 is pivoted counterclockwise toward zero indicator position, lift link 86 will move downwardly until pin 90 is in the upper end of slot 88, and further counterclockwise movement then is ineffectual to lower the lift link any farther, so that pin 84 then moves toward the lower end of slot 85. In this manner, lost motion is obtained in both end connections of link 86.

As shown in Figures 2 and 3, lever 92 is pivoted at 94 upon a second lever 96 which is pivoted at 98. Lever 92 is provided at its free end with a weight 100 which biases it in a counterclockwise direction about its pivot 94. The end of lever 96 opposite its pivot 98 is pivotally connected at 102 to a flexible pressure responsive coupling; for example, a bellows 104 which at its lower end is connected to the frame at 106. Coupling 104 when internally pressurized will expand axially to effect counterclockwise movement of the lever 96 and upon the relief of the pressure within the coupling 104 will collapse to effect clockwise movement of the lever 96. The limit of expansion of the coupling 104 is controlled by an adjusting screw 108 which is threadedly received in a bracket 110 secured to the frame. The purpose of this adjustment will be made apparent hereinafter.

The lever 92 is a support member for a valve member which engages a valve seat 112 of a pressure relief valve 111. The valve seat 112 is formed integral with a threaded nut 114 which is threadedly received on a sleeve 116 fixed to the frame. The threaded connection between the nut 114 and the sleeve 116 provides for axial adjustment of the valve seat 112 relative to the valve member on the lever 92 for a purpose hereinafter set forth.

From the foregoing detailed description it is apparent that lever arm 58 may move in its path in a counterclockwise direction a predetermined amount without moving lever 92 but that after reaching a predetermined limit position it will produce clockwise movement of lever 92 and disengage the valve member from the valve seat 112 to open the pressure relief valve 111.

The function of this pressure relief valve is, among others, through the control of the relay valve 118 to control the energization or deenergization of the fluid motor 76.

The relay valve 118 is of generally conventional construction being formed of an upper, an intermediate and a lower casing member designated 120, 122 and 124 which cooperate with diaphragms 126 and 128 to form three fluid chambers 130, 132 and 134. Chamber 130 is connected by a channel 136 to a pressure gauge 138, to the fluid motor 76, and to the flexible coupling 104. Thus a high pressure within chamber 130 will energize fluid motor 76 and effect expansion of the flexible coupling 104.

Fluid chamber 132 is connected through an outlet opening 140 to atmosphere.

Chamber 134 is connected at one end through a channel 142 to the pressure relief valve 111 formed by the valve seat 112 and the valve member on lever 92, and at its opposite end to a fluid channel 144 which is connected through a pressure reducing valve 146 and a duct 148 to the pressure regulator 70, check valve 72 and the auxiliary channel 12. Thus the pressure within chamber 134, so long as the pressure relief valve 111 is closed, is controlled by the pressure from channel 12 applied through the pressure reducing valve 146 and channel 144.

As best shown in Figure 4, the diaphragms 126 and 128 are fastened rigidly together by a clamped spacer 150 which has a passage through it from the underside of the lower diaphragm 128 to the space between the diaphragm 126 and 128 which, as previously indicated, is vented to atmosphere through aperture 140. A compression spring 152 is disposed coaxially beneath the diaphragms 126 and 128 and the spacer 150 to resiliently bias these members upwardly. The passage between chambers 130 and 132 through the member 150 is normally closed by the upper end of a valve member 154 which is resiliently biased by a spring 156 into engagement with the inlet to the openings through member 150. The lower end of the valve member 154 cooperates with a valve seat 158 to control fluid communication between the channel 144 and the chamber 130.

So long as the pressure relief valve is closed and pressure is maintained in chamber 134, the diaphragms 126 and 128 are forced downwardly sufficiently in opposition to the springs 152 and 156 and the pressure within the chamber 130 to close the opening between fluid chambers 130 and 132 and disengage the valve member 154 from the valve seat 158. Thus chamber 130 is subjected to the pressure from channel 144 so long as the pressure relief valve is closed. The relative sizes of the inlet to the chamber 134 from the channel 144 and the outlet from chamber 134 through the pressure relief valve is such that when the pressure relief valve is opened the downward loading of diaphragm 126 by the pressure in chamber 134 is relieved.

From the foregoing it is apparent that so long as the pressure relief valve 111 is closed the chamber 130 will be connected to channel 144 and pressure will thus be applied to energize the motor 76 and effect axial expansion of the flexible coupling 104.

When the pressure relief valve 111 is opened due to movement of the lever arm 58 in a counterclockwise direction to its limit position, the pressure within chamber 134 will be relieved thus permitting diaphragms 126 and 128 to move upwardly under the influence of the pressure within chamber 130 and of spring 152. This upward movement of the diaphragms 126 and 128 will disengage the member 150 from the upper end of the valve member 154 and simultaneously permit the valve member 154 to move outwardly under the influence of spring 156 to effect engagement of the lower ball end thereof with the valve seat 158 and thereby close the connection between channel 144 and the chamber 130. Thus by this upward movement of the diaphragms 126 and 128 chamber 130 is connected to the intermediate chamber 132 to permit relief of the pressure applied to the fluid motor 76 and to the coupling 104 through the bleed aperture 140 to atmosphere.

Relief of the pressure within the chamber 130 deenergizes the motor 76 and causes, under the influence of the spring 74, the shifting of valve 60 to its opposite position to energize the motor 52 to open the valve 48. Simultaneously with the deenergization of the motor 76, the flexible coupling 104 collapses thus causing lever 96 to pivot about its pivot 98 and lowering the pivot 94 of the lever 92. The lowering of pivot 94 of the lever 92 causes lever 92 to pivot about the pin 90 thus effecting further separation of the valve member relative to the valve seat 112 of the pressure relief valve. By this lowering of the pivot 94 upon relief of the pressure within the chamber 130 reclosure of the pressure relief valve can only be effected after the lever arm 58 has moved in a clockwise direction to its lower limit position which position is indicative of a flow through the main channel less than the flow at which the pressure relief valve was opened.

With the valve 48 opened in the manner just described, the flow will be distributed between the main and auxiliary channels. When the flow rate in the main channel has reduced to the predetermined minimum, the lever 58 will have pivoted sufficiently in a clockwise direction to permit closure of the pressure relief valve even with the pivot 94 of lever 92 in its shifted position. When the pressure relief valve closes, the pressure in the chamber 134 will be restored thereby shifting the diaphragms 126 and 128 downwardly to close the opening between chambers 130 and 132 and to open the channel between channel 144 and the chamber 130 thereby reestablishing pressurization of the fluid pressure responsive coupling 104 and reenergization of the fluid motor 76 to thereby, through its control of fluid motor 52, close the valve 48 and restore the pivot 94 of the lever 92 to its initial position and thus restore the control system and the fluid flow measuring system to its original condition.

Throughout the foregoing description, reference has been made to the limit positions of the lever arm 58. The lower limit position of lever arm 58 may be adjusted by placing the lever arm 58 in its desired lower limit position, and with the flexible coupling 104 in its collapsed condition, adjusting the axial position of the valve seat 112 of the pressure relief valve 111 by rotary manipulation thereof until it is just closed. In practice this adjustment is made simply by turning member 114 to align the appropriate indicia on sleeve 116 and member 114. The lever 58 is then moved to the desired upper limit position and, with the flexible coupling 104 expanded, the limit of its expansion may be adjusted by manipulation of screw 108 until the pressure relief valve 111 is just opened at such upper limit position of the lever arm 58. This adjustment is made in practice by the alignment of indicia (not shown) formed on the screw 108 and its mount at predetermined locations for this purpose.

From the foregoing detailed description it is apparent that we have provided new and greatly improved fluid flow measuring system in which auxiliary flow measuring units will be automatically, rapidly and positively cut into operation when the flow through the main flow measuring channel reaches a predetermined maximum and by which such auxiliary units will be automatically, rapidly and positively rendered inoperative when the flow through the main channel reaches a predetermined minimum.

For purposes of a clear understanding of terminology the phrase "fluid communication means" wherever used in this application is to be accorded a broad meaning, commensurate with the class of devices to which this invention pertains, covering any mechanism which does establish or is capable of establishing fluid communication from one location to another. It is a means for providing fluid communication and if necessary can be considered as including a valve means or other such components included along a conduit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A control system for controlling the fluid pressure in one conduit in response to variations in the flow of fluid through a second conduit, said system comprising a flow measuring instrument connected to said second conduit and having a flow indicating member movable between limit positions in response to variations in the flow through said second conduit to assume positions indicative of the flow therethrough, a pressure relief valve controlling fluid pressure in said first conduit comprising a valve member and a valve seat, a lost motion linkage connecting said flow indicating member to said valve member and operative upon assumption of one of said limit positions by said flow indicating member to open said pressure relief valve, means responsive to the relief of pressure in said first conduit for effecting relative separatory displacement of said valve seat and member independently of the movement of said linkage whereby closure of said relief valve under control of said linkage and said flow indicating member is prevented until said flow indicating member reaches the other of said limit positions, said last named means being effective upon reestablishment of pressure in said first conduit to reestablish the initial relative positions of said valve seat and member.

2. A control system for controlling the fluid pressure in one conduit in response to variations in the flow of fluid through a second conduit, said system comprising a flow measuring instrument connected to said second conduit and having a flow indicating member movable between limit positions in response to variations in the flow through said second conduit to assume positions indicative of the flow therethrough, a pressure relief valve controlling fluid pressure in said first conduit and comprising a valve member and valve seat, a lost motion linkage connecting said flow indicating member to said valve member and operative upon assumption of one of said limit positions by said flow indicating member to move said valve member away from said valve seat and open said pressure relief valve, means including a flexible pressure responsive coupling connected to said first conduit and having a control connection to said pressure relief valve and responsive to the relief of pressure therein, caused by the flow indicating member opening said pressure relief valve, for effecting relative separatory displacement of said valve seat and member independently of movement of said linkage whereby closure of said relief valve under control of said linkage and said flow indicating member is prevented until said flow indicating member reaches the other of its said limit positions, said flexible pressure responsive coupling being operative upon reestablishment of pressure in said first conduit to reestablish the initial relative positions of said valve seat, said valve member and said control connection.

3. The combination defined in claim 2 wherein said control connection comprises a pivoted lever and means connected to said flexible pressure responsive coupling to control the position of the pivot of said lever relative to said valve seat and said valve member is mounted on said pivoted lever.

4. In combination with a fluid flow system having main and auxiliary parallel connected flow channels and a flow measuring device connected in the main channel and in which the measuring device of said main channel includes a flow indicating member mounted for movement between limit positions and controlled by the flow through said main channel to assume positions indicative of the flow therethrough, a control system comprising: a shut-off valve adapted to be placed in said auxiliary channel, a reversible fluid motor connected to said shut-off valve, a first control valve connected between said motor and a source of control fluid under pressure and operative to control the alternative application of said control fluid pressure to effect forward or reverse drive of said motor, means resiliently biasing said first control valve to one of its limit positions, a second fluid motor connected to said control valve and operable when energized to shift said control valve to the other of its two limit positions in opposition to said resilient means, a fluid connection between said second fluid motor and said control fluid source for applying control fluid pressure to energize said second fluid motor, a second control valve connected into said fluid connection and including pressure operated actuating means, said actuating means including a pressure relief valve connected to control operation thereof and comprising valve closure and valve seat members, a lost motion linkage connecting said flow indicating member to one of said valve members and operative upon assumption of one of said limit positions by said flow indicating member to shift said one pressure relief valve member to cause actuation of said second control valve to relieve the fluid pressure in said fluid connections, and means responsive to the relief of pressure in said fluid connection for effecting relative separatory displacement of said valve seat and member independently of the movement of said linkage whereby return of said one relief valve member to initial position under control of said linkage and said flow indicating member is prevented until said flow indicating member reaches the other of said limit positions, said last-named means being effective upon re-establishment of pressure in said fluid connection by said second control valve to re-establish the initial relative positions of said valve seat and closure member.

5. The combination defined in claim 4 wherein said valve member is mounted on a pivoted lever and wherein said means for effecting relative separatory displacement of said valve seat and closure member independently of the movement of said linkage comprises a pressure responsive expansible coupling connected into said fluid connection and responsive to fluid pressure therein to control the position of the pivot of said lever relative to said valve member.

6. In a control system for controlling the fluid pressure in one conduit responsive to variations in the flow of fluid in a second conduit and comprising a flow measuring instrument connected in said second conduit and having a flow indicating member movable between extremes in response to variation in flow through said second conduit to assume positions indicative of the flow therethrough; a pressure relief valve control means controlling fluid pressure in said first conduit and comprising valve closure and valve seat members, a lost motion linkage for connecting one of said members to said flow indicating member so as to be operative upon assumption by said flow indicating member of one of said limit positions to open said pressure relief valve, a pressure responsive expansible coupling connected in said first conduit and connected to one of said valve members and responsive to the relief of pressure therein by the opening of said pressure relief valve for effecting relative separatory displacement of said valve seat and member independently of movement of said linkage whereby closure of said relief valve under control of said linkage and said flow indicating member is prevented until said flow indicating member reaches the other of its limit positions, said pressure responsve expansible coupling being operative upon re-establishment of pressure in said first conduit to re-establish the initial relative position of said valve seat and closure member, means for adjusting the position of one of said valve and valve seat members with respect to the other thereof for adjusting the limit positions at which said pressure relief valve opens and closes, and means for adjusting the extent of expansion of said expansible coupling responsive to application of pressure thereto.

7. For use in a multiple branch parallel conduit system where a valve in a first conduit is controlled in response to the fluid flow in a second conduit, a condition responsive differential control system comprising: a selectively operable actuating means for the valve; control means for said actuating means including a first controllable fluid communication means adapted to be connected between a fluid pressure source and said actuating means for the valve, and a valve means in said fluid communication means controlling fluid communication to said actuating means; means to open and close said valve means including a second fluid communication means connected to said first fluid communication means upstream of said valve means, and a pressure relief valve connection to said second fluid communication means; said relief valve comprising a support structure, a first normally stationary valve body, adjustably connected to said first support structure, including an outlet port surrounded by a valve seat, a second support structure pivotally mounted on said first support structure, a second valve member pivotally mounted on said second support structure at a position spaced from the pivotal mount of said second support structure and having a portion adapted to engage said valve seat and close said port upon rocking movement; a lever adapted to be moved in response to the fluid flow in the second conduit; a lost motion linkage connecting said lever to said second valve member at a position spaced from the second valve member pivotal mounting; and an expansible pressure responsive means connected to said second support structure at a position spaced from its pivotal mounting and in fluid communication with said first fluid communication means downstream of said first valve means, adapted to rock said second support and said second valve member about the pivotal mounting of said second support in response to the pressure of fluid in said fluid communication means downstream of said first valve means; and adjusting means on said first support adapted to engage and limit movement of said second support structure.

8. A fluid control system for use in combination with a fluid flow system having main and auxiliary parallel connected flow channels, comprising: a measuring device adapted to be connected in the main channel including a flow indicating member mounted for movement in a flow indicating range between limit positions and adapted to be controlled by the flow through the main channel to assume positions indicative of the flow therethrough; a shut-off valve adapted to be placed in the auxiliary channel to control flow therethrough; a reversible fluid motor connected to said shut-off valve; a two-position control valve connected to control said motor; fluid communication means connected to said two position control valve and adapted to be connected to one of the fluid channels to supply fluid under pressure to said two-position control valve which is selectively operative to control application of the fluid under pressure from the one channel to effect forward or reverse drive of said reversible fluid motor; resilient means biasing said control valve to one of its limit positions; a second fluid motor connected to said control valve and operable when energized to shift said control valve to the other of its two positions in opposition to said resilient means; and means actuated by said flow indicating member at one of its said limit positions to energize said second motor and at the other of its limit positions to de-energize such second fluid motor.

9. A fluid control system as defined in claim 8, wherein said means actuated by said flow indicating member includes a relief valve disposed in said fluid connection, a first means actuated at one of its said limit positions to open said relief valve and relieve the fluid pressure in said fluid connection to de-energize said second motor, and second means actuated at the other limit position of said flow indicating member to close said relief valve and re-establish fluid pressure in said fluid connection to re-energize said second fluid motor.

10. A fluid control system for use in combination with a fluid flow system having main and auxiliary parallel connected flow channels, comprising a flow measuring device adapted to be connected in the main channel including a flow indicating member mounted for movement in a flow indicating range between limit positions and adapted to be controlled by the flow through the main channel to assume positions indicative of the flow therethrough; a shut-off valve adapted to be placed in the auxiliary channel to control flow therethrough; a reversible fluid motor connected to said shut-off valve; a first control valve connected to control said motor; fluid communication means connected to said first control valve and adapted to be connected to one of the fluid channels to supply fluid under pressure to said first control valve which is selectively operative to control the application of the fluid pressure under pressure from the one channel to effect forward or reverse drive of said motor; resilient means biasing said first control valve to one of its limit positions; a second fluid motor connected to said first control valve and operable when energized to shift said first control valve to the other of its two positions in opposition to said resilient means; a fluid connection adapted to be connected to one of the channels for applying fluid pressure of one of the channels to energize said second fluid motor; a second control valve in said fluid connection, and means actuated by said flow indicating member at one of its limit positions to open said second control valve to relieve the fluid pressure in said fluid connection to de-energize said second motor and at the other limit position of said flow indicating member to close said second control valve to re-establish fluid pressure in said fluid connection to re-energize said fluid motor.

11. A fluid control system as defined in claim 8, wherein said means for controlling fluid pressure in said fluid connection includes a pressure relief valve comprising a valve member and a valve seat, a lost motion linkage connecting said flow indicating member to said valve member and operative upon assumption of one of said limit positions by said flow indicating member to open said pressure relief valve to cause relief of pressure in said fluid connection, and means responsive to the relief of pressure in said fluid connection for effecting relative separatory displacement of said valve seat and member independently of the movement of said linkage whereby closure of said relief valve and re-establishment of pressure in said fluid connection under control of said linkage and said flow indicating member is prevented until said flow indicating member reaches the other of said limit positions, said last named means being effective upon re-establishment of pressure in said fluid connection to re-establish the initial relative positions of said valve seat and member.

12. A fluid control system as defined in claim 8, wherein said means for controlling fluid pressure in said fluid connection includes a pressure relief valve comprising a valve member and a valve seat, a lost motion linkage connecting said flow indicating member to said valve member and operative upon assumption of one of said limit positions by said flow indicating member to open said pressure relief valve and to effect relief of pressure in said fluid connection, a flexible pressure responsive coupling connected to said fluid connection and to one of said valve members and responsive to the relief of pressure therein upon opening of said pressure relief valve for effecting relative separatory displacement of said valve seat and closure member independently of movement of said linkage whereby closure of said relief valve and re-establishment of pressure in said fluid connection under control of said linkage and said flow indicating member is prevented until said flow indicating member reaches the other of said limit positions, said flexible pressure responsive coupling being operative upon re-establishment of pressure in said fluid connection to re-establish the initial relative positioning of said valve seat and member.

13. The combination defined in claim 12, wherein said valve member is mounted upon a pivoted lever and wherein said flexible pressure responsive coupling is connected to control the position of the pivot of said lever relative to said valve seat.

14. In a fluid flow control system; an indicator adapted to be connected to one of two parallel connected fluid conduits to be normally responsive to fluid flow through the one conduit and having a flow indicating member movable through a range between limits in response to variation in fluid flow in the one conduit; and means, including control means operatively connected to said flow indicating member, adapted to provide fluid communication from the upstream fluid in the parallel conduits and responsive to assumption of a first predetermined flow indicating position by said flow indicating member adapted to enable diversion of at least a portion of upstream fluid to the other one of the two conduits and responsive to assumption of a second predetermined indicating position by said flow indicating member adapted to disenable flow through the other one of the two conduits, said control means including a control valve adapted to be installed in fluid communication with the upstream side of the conduits comprising valve closure and valve seat members, lost motion connection means operatively connecting one of said valve members to said flow indicating member whereby assumption of said first predetermined flow indicating position by said flow indicating member is effective to actuate said valve by separating said valve closure and valve seat members to condition said control means in a manner adapted to enable flow through the other one of the two conduits, and pressure responsive means operatively connected to at least one of said valve members independent of said means connecting one of the valve members to said flow indicating member and responsive to actuation of said control means to effect relative separatory displacement of said valve members independently of movement of said flow indicating member whereby said control means is rendered insensitive to positions of said flow indicating member until said flow indicating member assumes said second predetermined flow indicating position whereupon said flow indicating member is operative to actuate said control means in a direction adapted to disenable flow through the other one of the two conduits and cause said pressure responsive means to re-establish the initial relative positions of said valve members.

15. The fluid flow control system as defined in claim 14 including means for adjusting the relative positions of said valve and valve seat members with respect to each other for varying said positions of the flow indicating member at which said control valve is actuated, and means for adjusting the extent of separatory displacement of said valve members effected by said pressure responsive means on application of fluid pressure thereto.

16. In a fluid flow control system; an indicator adapted to be connected to one of two parallel connected fluid conduits to be normally responsive to fluid flow through the one conduit and including a flow indicating member movable through a range between limits in response to variation in fluid flow in the one conduit; a first valve means adapted to be disposed in control relation in the second of the two conduits, having fluid pressure operated valve actuating means operable when actuated in one direction to open said first valve means and operable when actuated in the other direction to close said first valve means; and control means for said valve actuating means comprising second valve means controlling application of fluid pressure to said valve actuating means including valve closure and valve seat members, lost motion link means providing a mechanical connection from one of said valve members to said flow indicating member and operative upon assumption of said first predetermined flow indicating position by said flow indicating member to shift said one valve member in a direction to cause application of fluid pressure to said valve actuating means to effect actuation of said first valve means to an open position and operative upon assumption of said second predetermined flow indicating position by said flow indicating member to shift said one valve member in a direction to close off fluid pressure to said valve actuating means to cause actuation thereby of said first valve means to a closed position.

17. The flow system defined in claim 16 including means responsive to a shift of said one valve member in said first direction to effect relative separatory displacement of said two valve members independently of the movement of said flow indicating member whereby return of said one valve member to initial position under control of said flow indicating member is prevented until said flow indicating member reaches the other of said predetermined flow indicating positions, said last named means being effective upon shift of said one valve member in said second direction to re-establish initial relative positions of said two valve members.

References Cited in the file of this patent

UNITED STATES PATENTS

| | | |
|---|---|---|
| 1,108,721 | Dodge | Aug. 25, 1914 |
| 1,503,591 | Kerr et al. | Aug. 5, 1924 |
| 1,759,384 | Wilkin et al. | May 20, 1930 |
| 1,874,858 | Beckwith et al. | Aug. 30, 1932 |
| 1,979,607 | Diehl | Nov. 6, 1934 |
| 2,588,839 | Horn | Mar. 11, 1952 |
| 2,629,460 | Maki | Feb. 24, 1953 |
| 2,630,820 | Gray | Mar. 10, 1953 |
| 2,633,750 | Langstaff | Apr. 7, 1953 |